(12) United States Patent
Vivien

(10) Patent No.: US 10,764,636 B2
(45) Date of Patent: Sep. 1, 2020

(54) METHOD FOR ANNOUNCING SERVICES IN A COMMUNICATION NETWORK

(71) Applicant: Sagemcom Broadband SAS, Rueil Malmaison (FR)

(72) Inventor: Nicolas Vivien, Rueil Malmaison (FR)

(73) Assignee: Sagemcom Broadband SAS, Rueil Malmaison (FR)

( * ) Notice: Subject to any disclaimer, the term of this patent is extended or adjusted under 35 U.S.C. 154(b) by 0 days.

(21) Appl. No.: 15/537,612

(22) PCT Filed: Dec. 17, 2015

(86) PCT No.: PCT/EP2015/080249
§ 371 (c)(1),
(2) Date: Jun. 19, 2017

(87) PCT Pub. No.: WO2016/097161
PCT Pub. Date: Jun. 23, 2016

(65) Prior Publication Data
US 2018/0124461 A1   May 3, 2018

(30) Foreign Application Priority Data

Dec. 19, 2014  (FR) ..................................... 14 62988

(51) Int. Cl.
*H04N 7/18* (2006.01)
*H04N 7/16* (2011.01)
(Continued)

(52) U.S. Cl.
CPC ..... *H04N 21/4586* (2013.01); *H04N 21/4332* (2013.01); *H04N 21/43615* (2013.01);
(Continued)

(58) Field of Classification Search
CPC ......... H04N 21/4586; H04N 21/43615; H04N 21/44227
(Continued)

(56) References Cited

U.S. PATENT DOCUMENTS

2004/0139173 A1   7/2004  Karaoguz et al.
2004/0193609 A1   9/2004  Phan et al.
(Continued)

FOREIGN PATENT DOCUMENTS

EP   1662711   5/2006
EP   2237528   10/2010

OTHER PUBLICATIONS

International Search Report, dated Feb. 15, 2016, priority document.

*Primary Examiner* — Kyu Chae
(74) *Attorney, Agent, or Firm* — Greer, Burns & Crain Ltd.

(57) ABSTRACT

A communication device, on detection of a change in availability of at least one of its hardware resources, implements an announcement phase comprising the following steps: obtaining a list of possible local services corresponding to actions that the communication device is able to implement relying on its hardware resources; obtaining a list of hardware resources of the communication device that are necessary for offering the local services; obtaining a list of local services available among the possible local services, according to the hardware resources necessary for offering the local services and according to the actual availability of its hardware resources; and announcing, via the communication network, the list of available local services obtained, in order to enable at least one managing device to present services globally available in the communication system by means of lists of available local services announced.

11 Claims, 4 Drawing Sheets

(51) Int. Cl.
   *H04N 21/458* (2011.01)
   *H04N 21/436* (2011.01)
   *H04N 21/433* (2011.01)
   *H04N 21/462* (2011.01)
   *H04N 21/45* (2011.01)
   *H04N 21/442* (2011.01)

(52) U.S. Cl.
   CPC ... *H04N 21/44227* (2013.01); *H04N 21/4516* (2013.01); *H04N 21/4622* (2013.01)

(58) Field of Classification Search
   USPC ............... 725/74, 78; 709/225, 227, 231
   See application file for complete search history.

(56) References Cited

U.S. PATENT DOCUMENTS

| | | | |
|---|---|---|---|
| 2004/0251887 A1* | 12/2004 | Sparrell | H04L 12/2805 323/312 |
| 2006/0031887 A1* | 2/2006 | Sparrell | H04L 12/2821 725/78 |
| 2006/0112018 A1 | 5/2006 | Lee | |
| 2007/0168051 A1* | 7/2007 | Bronnenberg | H04N 21/4332 700/20 |
| 2013/0246631 A1* | 9/2013 | Gonzales | H04N 21/6405 709/227 |
| 2014/0122720 A1* | 5/2014 | Jung | H04L 41/5054 709/225 |

\* cited by examiner

METHOD FOR ANNOUNCING SERVICES IN A COMMUNICATION NETWORK

CROSS-REFERENCES TO RELATED APPLICATIONS

This application claims the benefit of the French patent application No. 1462988 filed on Dec. 19, 2014, the entire disclosures of which are incorporated herein by way of reference.

BACKGROUND OF THE INVENTION

The present invention relates to the making available of services, in particular, vis-à-vis audio and/or video content, in a communication network.

Equipment, for example audiovisual equipment, such as STB (set top box) devices or HDDs (hard disk drives), may be interconnected by a communication network, e.g., domestic. Interconnecting such equipment by means of a communication network makes it possible, in particular, to share the hardware resources of the equipment and gives flexibility in the use of the equipment.

Solutions are known for creating a pool of hardware resources that can be presented to a user so as to be able to use services, at the system level, while benefiting from the communication network.

From a user point of view, it is not wished to have to manage directly a tuner, a hard disk drive or other hardware resource. It is wished only to view a content, to make a recording, etc., that is to say to carry out an action or a series of actions that is coherent at the system level and provides a user result by means of simple commands without complex programming or configuration. The communication system consisting of all this equipment must thus offer services allowing this.

It is desirable to overcome these drawbacks of the prior art. It is thus desirable, in such a context, to share hardware resources while masking the complexity of the configuration of management thereof. It is also desirable in such a context to make it possible to offer, to one or more users, services that are coherent at the system level, and which mask the complexity of configuration and management of the hardware resources while offering an open-ended solution when new types of hardware resources appear.

SUMMARY OF THE INVENTION

The invention relates to a method implemented by a communication device of a communication system, the communication device is connected via a communication network to other communication devices of the communication system. The method is such that the communication device, on detection of a change in availability of at least one of its hardware resources, implements an announcement phase comprising the following steps: obtaining a list of possible local services corresponding to actions that the communication device is able to implement relying on its hardware resources; obtaining a list of hardware resources of the communication device that are necessary for offering the local services; obtaining a list of local services available among the possible local services, according to the hardware resources necessary for offering the local services and according to the actual availability of its hardware resources; and announcing, via the communication network, the list of available local services obtained, in order to enable at least one managing device to present services globally available in the communication system by means of lists of available local services announced by the communication devices of the communication system. Thus, the complexity of the configuration and management of the hardware resources of the communication device are masked by the fact that the announcement is made on the local services available. This makes it possible to have an open-ended solution when new types of hardware resource appear, by virtue of such masking. By making the announcement on the change of availability of its hardware resources, the communication device ensures that it is presented with the actual information concerning the services.

According to a particular embodiment, in the announcement phase, the communication device under consideration indicates the list of local services available among the list of possible local services.

According to a particular embodiment, the announcement phase is also implemented on reception of a request from the managing device.

According to a particular embodiment, the request is associated with information representing a user profile, and the communication device refines the list of local services available by rejecting each local service that is incompatible with the user profile.

According to a particular embodiment, the communication device takes into account a planning of reservations of local services of the communication device, so that, when the planning shows that hardware resources must be occupied for a period of time that begins at a time below a predefined threshold, the communication device considers that the hardware resources are not available.

According to a particular embodiment, the announcement phase comprises the following steps: obtaining a list of audio and/or video content containing an identifier of each audio and/or video content that the communication device is able to receive, when the communication device is a device consuming audio and/or video content, and an identifier of each audio and/or video content that the communication device is able to provide, when the communication device is a source device for audio and/or video content; obtaining a list of possible local services vis-à-vis each audio and/or video content; and announcing the list of local services, vis-à-vis each audio and/or video content, that are available.

According to a particular embodiment, each communication device of the communication system implements the announcement phase on detection of a change in availability of at least one of its hardware resources, and in that each managing device determines services globally available in the communication system from lists of available local services as announced by the communication devices of the communication system.

According to a particular embodiment, each management device determines each service globally available in the communication system, by selecting an available local service or by combining available local services, in accordance with predefined rules.

According to a particular embodiment, each managing device refines the list of services globally available in the communication system, rejecting each service globally available in the communication system that is incompatible with a user profile.

The invention also relates to a communication device intended to be used in a communication system, the communication device being intended to be connected via a communication network to other communication devices in the communication system. The communication device is such that it comprises means for implementing an announcement phase, on detection of a change in availability of at least one of its hardware resources, using: means for obtaining a list of possible local services corresponding to actions that the communication device is able to implement by relying on its hardware resources; means for obtaining a list of hardware resources of the communication device that are necessary for offering the local services; means for obtaining a list of local services available among the possible local services, according to the hardware resources necessary for offering the local services and according to the actual availability of its hardware resources; and means for announcing, via the communication network, the list of available local services obtained, in order to enable the at least one managing device to present services globally available in the communication system by means of lists of available local services announced by the communication devices of the communication system.

The invention also relates to a computer program that can be stored on a medium and/or downloaded from a communication network in order to be read by a processor. This computer program comprises instructions for implementing the method mentioned above according to any of the variants thereof, when the program is executed by the processor. The invention also relates to storage means comprising such a computer program.

BRIEF DESCRIPTION OF THE DRAWINGS

The features of the invention mentioned above, as well as others, will emerge more clearly from a reading of the following description of an example embodiment, the description being given in relation to the accompanying drawings, among which.

DETAILED DESCRIPTION OF THE PREFERRED EMBODIMENTS

Figure 1:
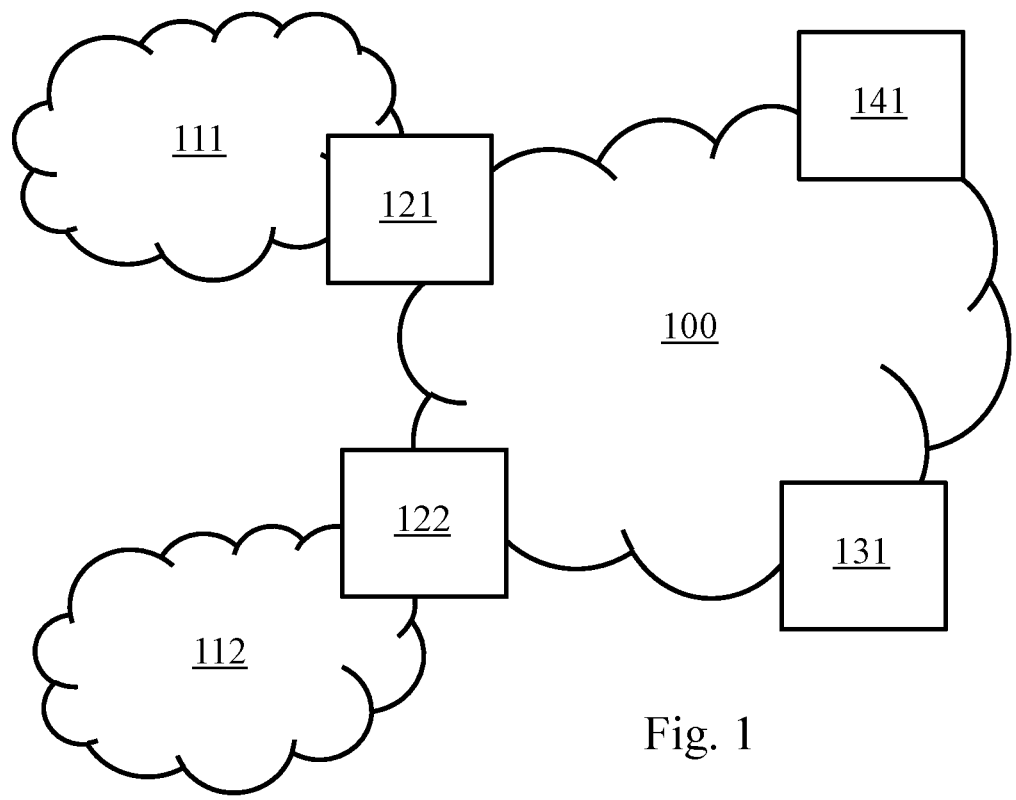
FIG. 1 illustrates schematically a communication system in which the present invention can be implemented.

FIG. 1 illustrates schematically a communication system in which the present invention can be implemented. The communication system in FIG. 1 comprises communication devices interconnected by a communication network 100.

The communication system in FIG. 1 preferentially comprises at least one device that is the source of audio and/or video content and at least one device consuming audio and/or video content. Communication devices that are both sources of such content and consumers of such content may also form part of the communication system and be connected to the communication network 100.

By way of illustration, the communication system in FIG. 1 comprises a first STB device 121 and a second STB device 122.

The first STB device 121 is able to receive, via a communication network 111, audio and/or video content in the form of live streaming, such as for example television channels. The first STB device 121 is able to receive, via the communication network 111, data streams corresponding to on-demand audio and/or video content. To do this, the first STB device 121 comprises one or more tuners. Hereinafter, it is considered by way of illustration that the first STB device 121 comprises two tuners. The data streams are for example in a format defined by the MPEG group (Moving Pictures Expert Group), e.g., the MPEG-2 format. Such tuners may also be used for receiving firmware updates. The communication network 111 is, for example, the internet and the STB device 121 fulfils the role of internet gateway on behalf of the communication devices connected to the communication network 100. The role of internet gateway may in a variant be implemented by a separate device to which the first STB device 121 is connected, via the communication network 100 or via a dedicated communication link. The communication network 100 is then a local area network (LAN), for example in accordance with the IEEE 802.3 family of standards or the IEEE 802.11 family of standards. The first STB device 121 is also able to record such audio and/or video content. The first STB device 121 is also able to supply such audio and/or video content to one or more consuming devices connected to the communication network 100. The first STB device 121 is thus considered here to be a device that is both a source of audio and/or video content and a consumer of audio and/or video content (since the first STB device 121 is capable of recording audio and/or video content). An example of hardware architecture of the first STB device 121 is detailed hereinafter in relation to FIG. 2B.

The second STB device 122 is able to receive, via a communication network 112, audio and/or video content in the form of live streaming, such as for example television channels. To do this, the second STB device 122 comprises one or more tuners. Hereinafter, it is considered by way of illustration that the second STB device 122 comprises only one tuner. The data streams are for example in accordance with a format defined by the MPEG group, e.g., the MPEG-2 format. Such tuners may also be used for receiving firmware updates. The communication network 112 is for example a satellite television broadcasting network or a cable television broadcasting network. The second STB device 122 is also able to supply, to one or more consuming devices connected to the communication network 100, such audio and/or video content. The second STB device 122 is thus considered here to be a device that is the source of audio and/or video content. An example of hardware architecture of the second STB device 122 is detailed hereinafter in relation to FIG. 2C.

Still by way of illustration, the communication system in FIG. 1 also comprises an NAS (network attached storage) device 131. The NAS device 131 is able to record audio and/or video content supplied by means of the communication network 100, for example by the first STB device 121 or the second STB device 122. The NAS device 131 is also able to supply, to one or more consuming devices connected to the communication network 100, such audio and/or video content recorded. The NAS device 131 is then considered here to be a device that is both a source and consumer of audio and/or video content. An example of hardware architecture of the NAS device 131 is detailed below in relation to FIG. 2D.

Still by way of illustration, the communication system in FIG. 1 further comprises a content-presentation device 141 via which a user interacts with the communication system and via which the user plays audio and/or video content. The content-presentation device 141 is then considered here to be a device consuming audio and/or video content. An example of hardware architecture of a content-presentation device 141 is detailed hereinafter in relation to FIG. 2A. It is also possible for the functionalities of interaction with the user (and therefore of management of services globally available in the communication system) and of content presentation to be implemented on communication devices of the communication network 100 that are separate.

It is also possible for the communication system to comprise a plurality of such content-presentation devices, which have respective man-machine interfaces for interacting with users and in particular which enable the users to enter personal identification data (e.g., user identifier and password) in order to know the profile of the user interacting with such and such a content-presentation device. As detailed hereinafter, this aspect makes it possible to present to a user services globally available in a communication system that match the profile of the user.

Each communication device in the communication network 100 thus comprises a set of hardware resources making it possible to offer services vis-à-vis the audio and/or video content as well as optionally supplementary management services (e.g., firmware update, parameterizing of the communication device) of the communication device. Such hardware resources are for example one or more tuners, one or more data storage spaces, one or more communication interfaces (e.g., USB (universal serial bus) port), an integrated webcam, one or more components dedicated to a particular processing (e.g., transcoding) or to a particular management action of the communication device (e.g., microprogram update, parameterizing of the communication device) etc. Some communication devices in the communication network 100 may offer only management services (e.g., parameterizing) for the communication device.

Such services are said to be local when they correspond to actions, in particular vis-à-vis an audio and/or video content, that a communication device under consideration is able to implement by itself, or that a set of communication devices considered to be a whole is able to implement by itself, i.e., by relying on its own hardware resources. Such services are for example services of audio and/or video content processing, of making audio and/or video content available for presentation, of recording audio and/or video content, of configuration of the communication device, of updating of firmware of the communication device, of access to online games, of access to websites, etc.

Thus, the first STB device 121 is able to provide a local service of internal recording of an audio and/or video content that the first STB device 121 receives from the communication network 111. The first STB device 121 is also able to provide a local service of supply, to one or more consuming devices via the communication network 100, of an audio and/or video content recorded internally or of an audio and/or video content that the first STB device 121 receives from the communication network 111. The first STB device 121 may be able to provide other local services, in particular independently of any audio and/or video content.

Likewise, the second STB device 122 is able provide a local service of supply, to one or more consuming devices via the communication network 100, of an audio and/or video content that the second STB device 122 receives from the communication network 112. The second STB device 122 may be able to provide other local services, in particular independently of any audio and/or video content.

The NAS device 131 is then able to provide a local service of internal recording of an audio and/or video content that the NAS device 131 receives from a source device via the communication network 100. The NAS device 131 is also able to provide a local service of supply, to one or more consuming devices via the communication network 100, of an audio and/or video content recorded internally. The NAS device 131 may be able to provide other local services, in particular independently of any audio and/or video content.

Finally, the content presentation device 141 is able to provide a local service of presentation of an audio and/or video content that the content presentation device 141 receives from a source device via the communication network 100. The content presentation device 141 may be able to provide other local services, in particular independently of any audio and/or video content.

Each communication device of the communication system is configured to announce, to at least one device managing services globally available in the communication system, the local services that the communication device offers and which are available in the light of an actual availability of the hardware resources of the communication device. The announcement of the available local services is therefore dynamically adapted according to the actual availability of the hardware resources of the communication device offering the local services. This aspect is detailed below in relation to FIG. 3. The announcement of the available local services may furthermore be dynamically adapted according to the profile of a user to whom services globally available in the communication system (defined according to the local services available in the communication system) are presented.

By receiving the announcements made by the communication devices connected to the communication network 100, each of the managing devices is capable of determining a list of services globally available in the communication system. The managing device does not have to take into account the hardware resources actually available with each of the communication devices connected to the communication network 100, this aspect being masked by the communication devices that announce in real time the local services that the communication devices can actually offer respectively. The behavior of the managing device is detailed below in relation to FIGS. 4 to 6.

The communication system may comprise one or more managing devices. It is considered hereinafter by way of illustration, unless mentioned to the contrary, that the communication system comprises only one managing device.

The managing device is one of the devices in the communication network 100. The managing device is typically a communication device via which the user interacts in order to control the communication system. By way of illustration, the content presentation device 141 fulfils the role of the managing device.

FIGS. 2A to 2D illustrate schematically examples of hardware architecture of communication devices in the communication system.

These examples of hardware architecture are based on a common base according to which each communication device comprises, connected by a communication bus 220: a processor or CPU (central processing unit) 210; a random-access memory (RAM) 211; a read-only memory (ROM) 212; a storage unit or a storage medium reader, such as an SD (secure digital) card reader; and a set of interfaces 214 enabling the communication device to communicate within the communication system.

The processor 210 is capable of executing instructions loaded in the RAM 211 from the ROM 212, from an external memory (not shown), from a storage medium, or from a communication network. When the communication device is powered up, the processor 210 is capably of reading instructions from the RAM 211 and executing them. These instructions form a computer program causing the implementation, by the processor 210, of all or some of the algorithms and steps described below.

Thus, all or some of the algorithms and steps described below can be implemented in software form by the execution of a set of instructions by a programmable machine, such as a DSP (digital signal processor) or a microcontroller. All or some of the algorithms and steps described below can also be implemented in hardware form by a machine or a dedicated component, such as an FPGA (field-programmable gate array) or an ASIC (application-specific integrated circuit).

Each example of hardware architecture further comprises one or more hardware resources specific to the communication device to which the hardware architecture is adapted. This aspect is detailed below.

Figure 2A:
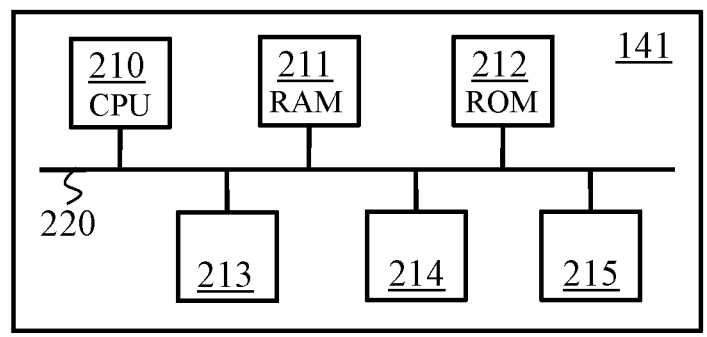
FIG. 2A illustrates schematically an example of hardware architecture of a device that is a destination of audio and/or video content and with which a user interacts with the communication system.

FIG. 2A illustrates schematically an example of hardware architecture of the content presentation device 141. According to this example of hardware architecture, the content presentation device 141 further comprises a man-machine interface 215 for interacting with the user, in particular displaying via a screen services globally available within the communication system and receiving commands from the user. The man-machine interface 215 is more particularly suitable for displaying via the screen one or more video content (for example in PIP "picture-in-picture" mode) and/or for broadcasting audio content via loudspeakers. The man-machine interface 215 can be adapted to enable the user to supply, e.g., enter, personal identification data, thus making it possible to determine which is the profile of the user (e.g., age, sex, access rights) from a list of predetermined profiles.

Figure 2B:
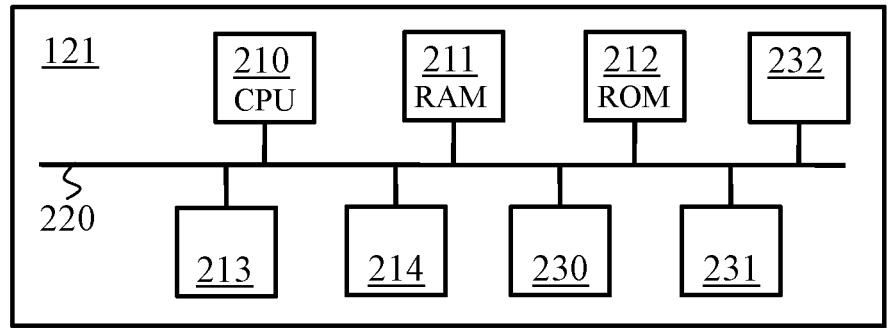
FIG. 2B illustrates schematically an example of hardware architecture of a first device that is the source of audio and/or video content of the communication system.

FIG. 2B illustrates schematically an example of hardware architecture of the first STB device 121. According to this example of hardware architecture, the first STB device 121 further comprises a first tuner 230 and a second tuner 231. These tuners can supply, at least for some audio and/or video content, data streams with different characteristics, such as for example different resolutions, and/or these tuners can make it possible to capture different sets (optionally with overlap) of television channels. Each tuner is thus able to receive audio and/or video content by means of a communication network, such as the communication network 111. According to this example of hardware architecture, the first STB device 121 further comprises a hard disk HDD 232, or any other data storage means, such as for example EEPROM memory (electrically-erasable programmable read-only memory) of the flash type. The hard disk HDD 232 makes it possible to record audio and/or video content from the first tuner 230 and/or from the second tuner 231, and makes it possible to supply audio and/or video content recorded via the communication network 100. The first STB device 121 is thus able to be configured so that an audio and/or video content obtained via the first tuner 230 is recorded on the hard disk HDD 232 and/or supplied to at least one consuming device of the communication network 100 via the interface dedicated to the set of interfaces 214. The first STB device 121 is also able to be configured so that an audio and/or video content obtained via the second tuner 231 is recorded on the hard disk HDD 232 and/or supplied to at least one consuming device in the communication network 100 via the dedicated interface in the set of interfaces 214. The first STB device 121 is also able to be configured so that an audio and/or video content recorded on the hard disk HDD 232 is supplied to at least one consuming device of the communication network 100 via the dedicated interface in the set of interfaces 214.

Figure 2C:
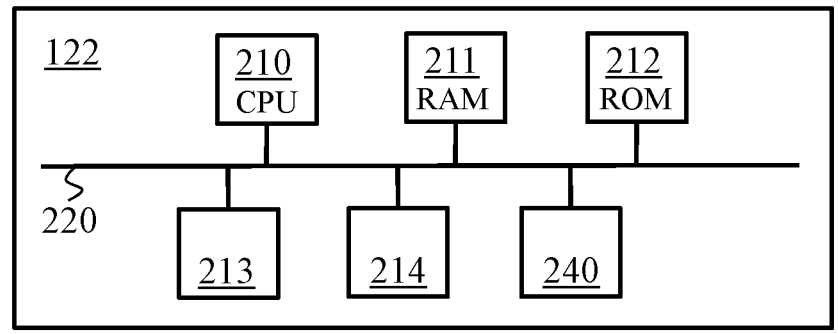
FIG. 2C illustrates schematically an example of hardware architecture of a second device that is the source of audio and/or video content of the communication system.

FIG. 2C illustrates schematically an example of hardware architecture of the second STB device 122. According to this example of hardware architecture, the second STB device 122 also comprises a tuner 240 able to receive audio and/or video content by means of a communication network, such as the communication network 112. The second STB device 122 is thus able to be configured so that an audio and/or video content obtained by the tuner 240 is supplied to at least one consuming device in the communication network 100 via the dedicated interface in the set of interfaces 214.

Figure 2D:
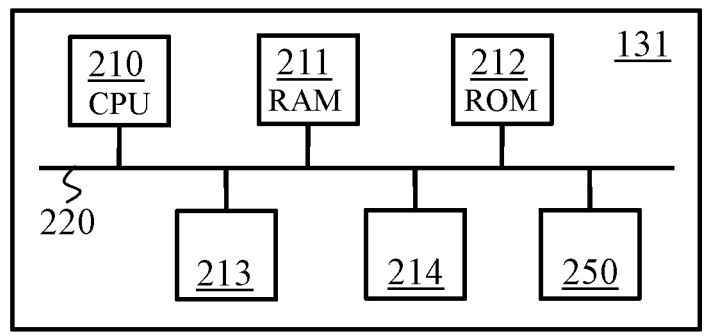
FIG. 2D illustrates schematically an example of hardware architecture of a third device that is the source and destination of audio and/or video content of the communication system.

FIG. 2D illustrates schematically an example of hardware architecture of the NAS device 131. According this example of hardware architecture, the NAS device 131 further comprises a hard disk HDD 250, or any other data storage means, such as for example EEPROM memory of the flash type. The NAS device 131 is thus able to be configured so that an audio and/or video content supplied by a source device of the communication network 100 via the dedicated interface in the set of interfaces 214 is recorded on the hard disk HDD 250. The NAS device 131 is also able to be configured so that an audio and/or video content recorded on the hard disk HDD 250 is supplied to at least one consuming device in the communication network 100 via the dedicated interface in the set of interfaces 214.

Figure 3:
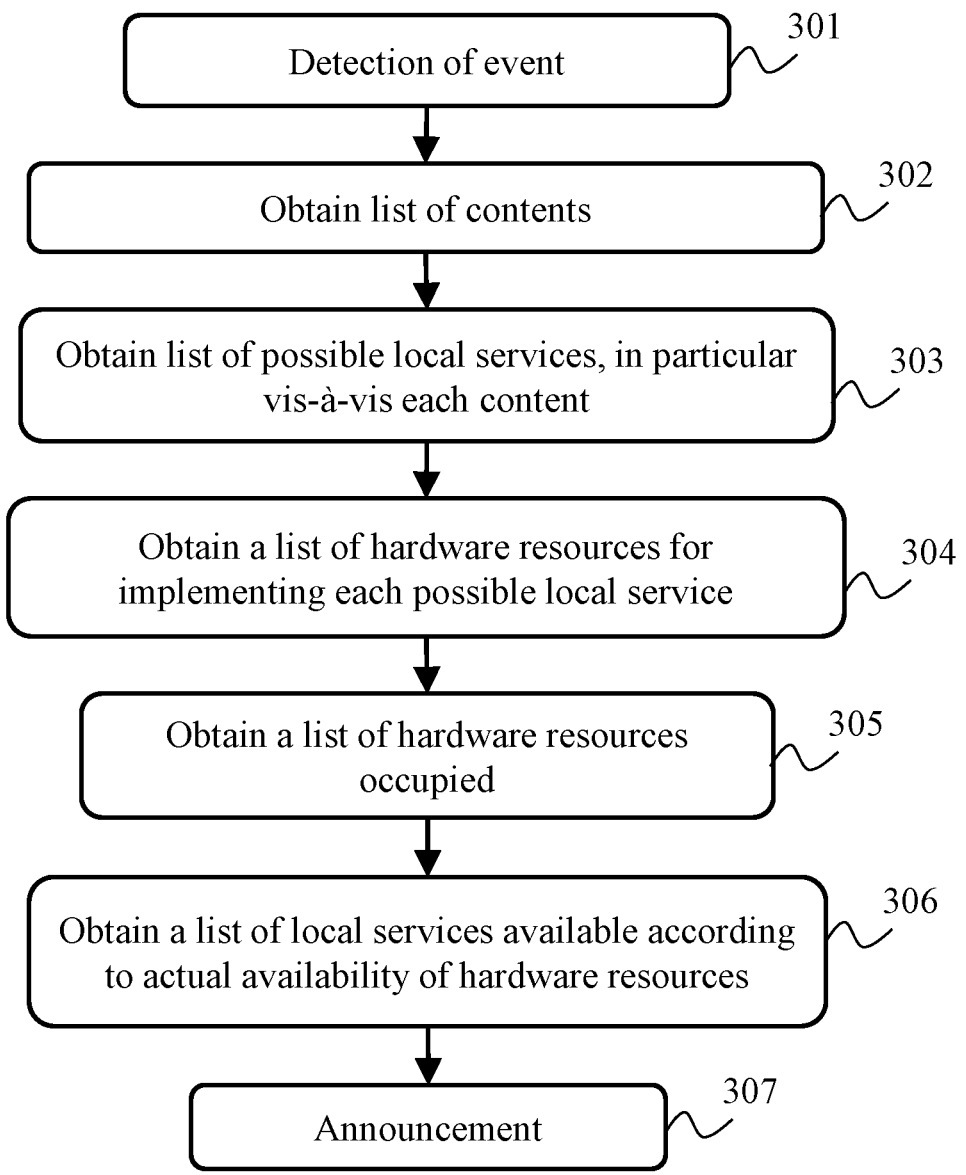
FIG. 3 illustrates schematically an algorithm for announcing services locally available on a device of the communication system.

FIG. 3 illustrates schematically an algorithm for announcing services locally available on a communication device of the communication system. In the illustrative context of the communication system in FIG. 1, the algorithm in FIG. 3 is more particularly executed by the first STB device 121, by the second STB device 122, by the NAS device 131 and by the content presentation device 141.

In a step 301, the communication device under consideration detects an event meaning that the communication device under consideration announces the local services that the communication device under consideration is actually capable of offering. Such an event may be generated by the communication device under consideration after connection to the communication network 100. Such an event may also be generated by the communication device under consideration on reception of a request from the device managing services globally available within the communication system. Such an event may also be generated by the communication device under consideration on detection of a change in use of its hardware resources (allocation or release) and/or on detection of a cable disconnection (or respectively connection) thus making unavailable (or respectively available) hardware resources of the communication device under consideration and/or on detection of a change in communication performance (e.g., signal quality, error rate, etc.) of the communication device under consideration making hardware resources of the communication device under consideration at least partly unavailable. Such an event may also be generated by the communication device under consideration on detection of an activation (or respectively deactivation) of a parental control making some audio and/or video content unavailable (or respectively available), and/or making some hardware resources unavailable (or respectively available). Thus, in general terms, such an event may also be generated by the communication device under consideration on detection of a change in availability of its hardware resources.

In a following step 302, the communication device under consideration obtains a list of audio and/or video content. This list of audio and/or video content contains an identifier of each audio and/or video content that the communication device under consideration is able to receive, when the communication device is a consuming device. This list of audio and/or video content contains an identifier of each audio and/or video content that the communication device under consideration is able to supply, when the communication device is a source device.

When the audio and/or video content is a content broadcast via a television channel, the audio and/or video content identifier can be obtained from a program guide, defined so that the same television channel broadcast via two distinct communication networks (such as the communication networks 111 and 112) has only one identifier and is therefore effectively perceived as the same audio and/or video content. This identifier is for example the name of the television channel under consideration.

When the audio and/or video content is a recorded content, the identifier is derived from metadata associated with the file in which the audio and/or video content is stored. These metadata may typically contain strings of characters entered by the user at the time of ordering the recording, or data automatically obtained by a communication device connected to the communication network 100 at the time of ordering the recording (as would be the case in a time-shifting service). These metadata preferentially contain information on the format (e.g., resolution) in which the audio and/or video content was recorded.

When the audio and/or video is a content that the communication device under consideration is able to receive coming from the communication network 100, the audio and/or video content is identified by a first predefined identifier, which represents not the audio and/or video content itself but the fact that the communication device under consideration is able to receive such an audio and/or video content via its interface with the communication network 100. The first predefined identifier is preferentially associated with information on formats, e.g., resolution, in which the audio and/or video content is accepted.

When the audio and/or video content is a content that the communication device under consideration is able to supply via the communication network 100, the audio and/or video content is identified by a second predefined identifier, which thus represents not the audio and/or video content itself, but the fact that the communication device under consideration is able to supply such audio and/or video content via its interface with the communication network 100. The second predefined identifier is preferentially associated with information on formats, e.g., resolution, in which the audio and/or video content can be supplied.

By way of illustration, considering that the NAS device 131 has hardware resources for recording one or more audio and/or video content and simultaneously supplying one or more audio and/or video content recorded, via its interface with the communication network 100, the NAS device 131 then obtains a list in which there appear the identifiers of the audio and/or video content recorded by the NAS device 131, as well as the first predefined identifier in the second predefined identifier. When the communication device under consideration is not manipulating any audio and/or video content, step 302 is not performed. Step 302 is therefore in this regard optional.

In a following step 303, the communication device under consideration obtains a list of possible local services, that is to say, a list of actions that the communication device under consideration can perform on behalf of the user by means of its hardware resources (independently of the actual availability of the hardware resources at this stage). When applicable, the communication device under consideration obtains a list of possible local services for each audio and/or video content, that is to say, a list of actions that the communication device under consideration can perform on behalf of the user vis-à-vis the audio and/or video content listed in step 302. In order to determine the local services possible for each audio and/or video content, the communication device under consideration can rely on the format information associated with the identifier of the audio and/or video content.

By way of illustration, the first STB device 121 offers the following local services: supplying a television channel in high resolution via the communication network 100 (e.g., by means of the first tuner 230); supplying a television channel in standard resolution via the communication network 100 (e.g., by means of the second tuner 231); internally recording a television channel in standard resolution (e.g., the hard disk HDD 232 may be capable of recording only in standard resolution); supplying an audio and/or video content recorded internally; recording internally an audio and/or video content coming from the communication network 100; updating firmware controlling the first STB device 121; etc.

In a following step 304, the communication device under consideration obtains a list of hardware resources of the communication device under consideration that is necessary for implementing each possible local service identified at step 303. The hardware resources necessary for implementing each local service that the communication device under consideration can offer are predefined. When the local service under consideration is applied vis-à-vis an audio and/or video content, the necessary hardware resources are predefined in particular according to the origin (e.g., tuner output, or in the internal memory) and optionally the format e.g., the resolution, the audio and/or video content.

In a following step 305, the communication device under consideration obtains a list of its hardware resources occupied (e.g., current use of the communication device). A list of its hardware resources still available is equivalent. The communication device under consideration thus makes an evaluation of the actual availability of its hardware resources.

In a particular embodiment, the communication device under consideration takes into account programmed reservations of local services of the communication device under consideration. The communication device under consideration then plans, e.g., on user request, uses of its local services or in more general terms its hardware resources. If the planning shows that hardware resources must be occupied in a period of time that begins in a time less than a predefined threshold (e.g., fifteen minutes), the communication device under consideration can consider that the hardware resources relating to this planned use are not available. Such planning may be at least partially obtained by statistical analysis of the actions performed by the communication device over time.

In a following step 306, the communication device under consideration refines the list of possible local services obtained at step 303, according to the hardware resources of the communication device under consideration that are necessary for implementing each possible local service and according to the actual availability of the hardware resources. The communication device under consideration rejects the local services using at least one hardware resource that is not available. The communication device under consideration then obtains a list of available local services.

In a particular embodiment, the communication device under consideration also refines the list of possible local services obtained at step 303, according to a user profile that would be communicated in advance by the device managing services available globally within the communication system and predefined rules that take into account the user profile. The communication device thus rejects each local service incompatible with the user profile. For example, the communication device under consideration inhibits, or not, access to certain local services according to the age of the user on behalf of whom the managing device acts. As mentioned below in relation to FIG. 6, this refinement step may in a variant be implemented by the managing device.

In a following step 307, the communication device under consideration announces, via the communication network 100, the list of available local services (i.e., locally and actually available) obtained at step 306.

When applicable, each audio and/or video content for which no local service can be offered in the light of the actual availability of the hardware resources of the communication device under consideration is not announced.

In a particular embodiment, the communication device under consideration indicates in the announcement the list of available local services among the list of possible local services.

In a particular embodiment, the communication device under consideration makes the announcement in accordance with the SSDP (Simple Service Discovery Protocol).

The algorithm in FIG. 3 therefore proposes an announcement phase that is implemented by a communication device on detection of a change in availability of at least one of its hardware resources.

Figure 4:
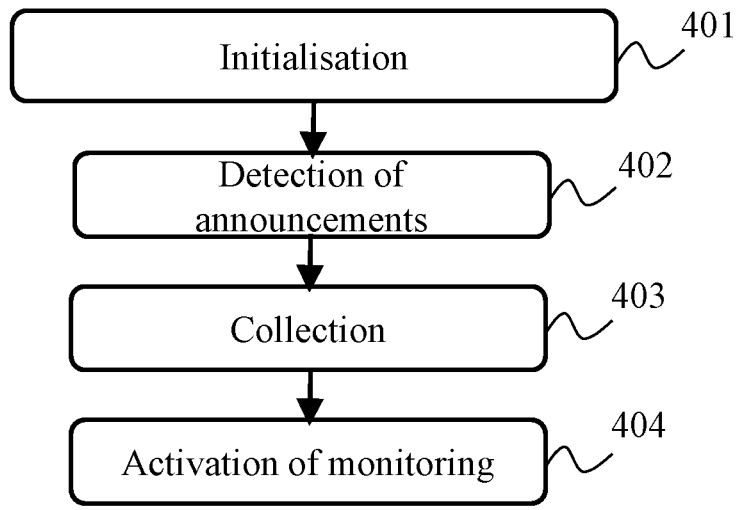
FIG. 4 illustrates schematically an algorithm for collecting information relating to services locally available on devices of the communication system.

FIG. 4 illustrates schematically an algorithm for collecting information relating to services locally available on communication devices connected to the communication network 100. The algorithm in FIG. 4 is executed by the device managing services globally available within the communication system.

In a step 401, the managing device is initialized. This initialization step can follow an election in the communication network 100 in order to determine which communication device takes the role of the managing device. This initialization step can follow a switching on of the managing device (when the managing device is predefined or when a plurality of such managing devices are present in the communication system).

In a following step 402, the managing device sends a request asking each other communication device connected to the communication network 100 to announce the list of services locally available on the other communication device. The managing device may include in the request, or in a separate message, information representing a user profile to which the request is applicable. This enables each communication device to refine its announcement according to the user profile. The announcements may thus be broadcast (the same announcement for every the managing device) or be sent in unicast mode (announcement adapted to the profile of the user on behalf of which the managing device under consideration is acting). The managing device next detects receptions of announcements of lists of local services available, as sent by execution of step 307 by each other communication device.

In a following step 403, the managing device collects the lists of available local services contained in the announcements received. With regard to local services vis-à-vis audio and/or video content, the managing device preferentially collects the format information on the audio and/or video content. Once the lists of available local services have been collected, the managing device must determine the services globally available within the communication system. This aspect is detailed below in relation to FIG. 6.

In a following step 404, the managing device activates a mechanism for monitoring the local services available. This mechanism is detailed hereinafter in relation to FIG. 5.

Figure 5:
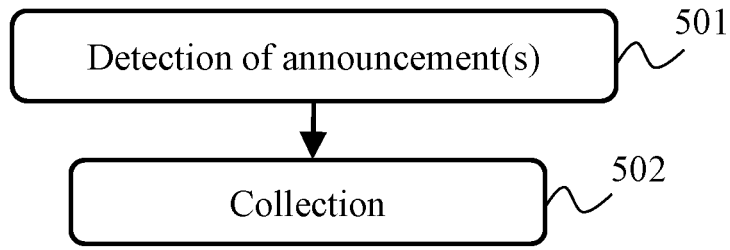
FIG. 5 illustrates schematically an algorithm for monitoring services locally available on the devices of the communication system.

FIG. 5 illustrates schematically an algorithm for monitoring services locally available on the communication devices connected to the communication network 100. The algorithm in FIG. 5 is a mechanism for monitoring local services available on the communication devices connected to the communication network 100, and is executed by each device managing services globally available within the communication system.

In a step 501, the managing device detects at least one new announcement as sent by execution of step 307 and thus received coming from the communication network 100. Such an announcement may follow an appearance of a new communication device on the communication network, or a change in the availability of the hardware resources of at least one communication device.

In a following step 502, the managing device collects the lists of available local services contained in the announcement received. With regard to the local services vis-à-vis audio and/or video content, the managing device preferentially collects the information on format of the audio and/or video content. The managing device thus updates the list of local services available for each communication device that transmitted an announcement received at step 501.

In a similar manner, the managing device deletes the list of local services available for each communication device that the managing device has detected as being disconnected from the communication network 100.

Once the lists of available local services have been updated, the managing device must update the services globally available within the communication system. This aspect is detailed below in relation to FIG. 6.

Figure 6:
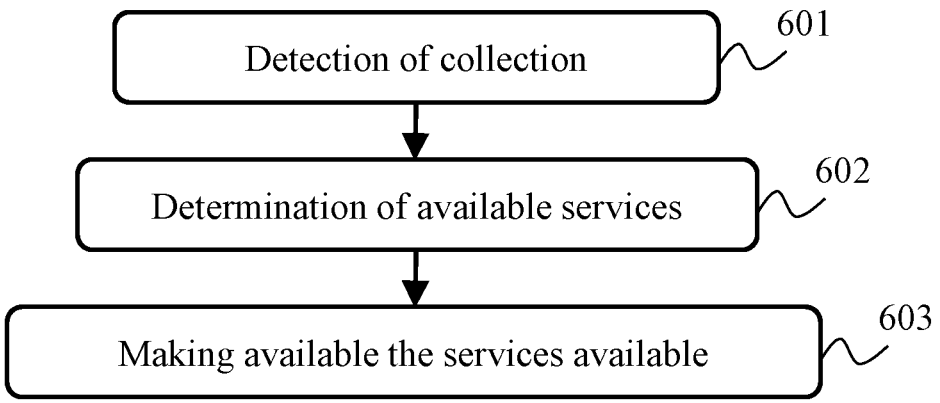
FIG. 6 illustrates schematically an algorithm for making available services globally available in the communication system.

FIG. 6 illustrates schematically an algorithm for making available services globally available within the communication system. The algorithm in FIG. 6 is executed by the device managing services globally available within the communication system.

In a step 601, the managing device detects that lists of local services available have been collected or updated.

In a following step 602, the managing device determines services globally available within the communication system from the lists of available local services that have been collected or updated. In other words, the managing device determines which services are actually made available to the user in the light of the actual availability of the hardware resources of the communication system. Each service globally available within the communication system is defined by an available local service, or a chain of local services available. With regard to the audio and/or video content, each service globally available within the communication system is defined by an available local service, or a chain of available local services, applicable to the audio and/or video content in order to be consumed.

The managing device determines each service globally available within the communication system, by selecting an available local service or by combining available local services, in accordance with predefined rules. These rules ensure that each service offered to the user is coherent at the system level. By way of illustration, the managing device determines the following services globally available within the communication system according to the lists of available local services collected or updated: viewing a television channel in high resolution; recording a television channel in high resolution; recording a television channel in standard resolution; viewing a recorded content; playing an online game; accessing a website; updating firmware of a communication device; etc.

By way illustration, if the NAS network storage device 131 has announced an available local service of the "internally recording an audio and/or video content coming from the communication network 100" type and the second STB device 122 has announced an available local service of the "providing a television channel in standard resolution via the communication network 100" type, the managing device may offer a service globally available within the communication system of the "recording a television channel in standard resolution" type.

The list of services globally available within the communication system is thus dynamically updated along with the announcements broadcast via the communication network 100 which themselves are broadcast following changes in availability of the hardware resources of the communication devices connected to the communication network 100. The management device is capable of determining the list of services globally available within the communication system from among the services globally possible within the communication system.

In a particular embodiment, the managing device refines the list of services globally available within the communication system, according to a user profile that is associated with the user on behalf of whom the managing device acts and predefined rules that take into account the user profile. The managing device thus rejects each service globally available within the communication system that is incompatible with the user profile. For example, the managing device inhibits or not access to certain services globally available within the communication system according to the age of the user on behalf of whom the managing device is acting.

In a following step 603, the managing device makes available to the user, or any other communication device connected to the communication network 100 that can interact with the user, the list of services globally available within the communication system. In the light of the above, this making available may depend on the profile of the user in question.

In communication systems where conflicts in orders or reservation of hardware resources may arise, a communication device connected to the communication network 100 that can interact with the user can display an alert message and optionally ask the user what choice to make. In such situations, a communication device connected to the communication network 100 may in a variant decide on the choice to be made (which service to refuse or accept), in accordance with predefined rules.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method implemented by a communication device of a communication system, said communication device being connected via a communication network to other communication devices of said communication system, wherein on detection of a change in availability of at least one of its hardware resources, the change in availability of the at least one hardware resources is related to the detection the connection of the communication device to the communication network and/or to a cable disconnection or connection, said method causing the communication device to perform an announcement phase by:

obtaining a list of possible local services corresponding to actions that said communication device is able to implement relying on its hardware resources; the local being services comprising of one of the following service services: audio and/or video content processing, making audio and/or video contents available for presentation, recording audio and/or video contents, configuration of said communication device, updating of firmware of said communication device, access to online games, access to websites;

obtaining a list of hardware resources of said communication device that are necessary for offering said local services and said communication device takes into account a planning of reservations of local services of said communication device, so that, when the planning shows that hardware resources must be occupied for a period of time that begins at a time below a predefined threshold, said communication device considers that said hardware resources are not available and the communication device refines the list of possible local services according to the availability of the hardware resources;

obtaining a list of local services available among the possible local services, according to the hardware resources necessary for offering said local services and according to the actual availability of its hardware resources; the hardware resources being one or more tuners and/or one or more data storage spaces and/or one or more communication interfaces and/or an integrated webcam and/or one or more components dedicated to a particular processing; and, announcing, via the communication network, the list of available local services obtained, in order to enable at least one managing device to present services globally available in the communication system via lists of available local services announced by the communication devices of said communication system.

2. The method according to claim 1, wherein, in the announcement phase, the communication device under consideration indicates the list of local services available among the list of possible local services.

3. The method according to claim 1, wherein the announcement phase is further implemented on reception of a request from said at least one managing device.

4. The method according to claim 1, wherein said request is associated with information representing a user profile, and wherein said communication device refines the list of local services available by rejecting each local service that is incompatible with said user profile.

5. The method according to claim 1, wherein said method causing the communication device to perform the announcement phase by:
  obtaining a list of audio and/or video content containing an identifier of each audio and/or video content that said communication device is configured to receive, when said communication device is a device consuming audio and/or video content, and an identifier of each audio and/or video content that said communication device is configured to provide, when said communication device is a source device for audio and/or video content;
  obtaining a list of possible local services vis-à-vis each audio and/or video content; and
  announcing the list of local services, vis-à-vis each audio and/or video content, that are available.

6. The method according to claim 1, wherein each communication device of said communication system implements the announcement phase on detection of a change in availability of at least one of its hardware resources, and wherein each managing device determines services globally available in the communication system from lists of available local services as announced by the communication devices of said communication system.

7. The method according to claim 6, wherein each managing device determines each service globally available within the communication system, selecting an available local service or combining available local services, according to predefined rules.

8. The method according to claim 6, wherein each managing device refines the list of services globally available within a communication system, rejecting each service globally available within the communication system that is incompatible with a user profile.

9. A non-transitory computer-readable medium having computer-executable program instructions stored thereon, comprising instructions for the implementation, by a processor of a communication device, of the method according to claim 1, when said program is executed by said processor.

10. A non-transitory storage device having stored thereon computer-executable instructions for the implementation, by a processor of a communication device, of the method according to claim 1, when said program is executed by said processor.

11. A communication device configured to be used in a communication system, said communication device being intended to be connected via a communication network to other communication devices in said communication system:
wherein the communication device comprises circuitry causing the communication device to perform an announcement phase, on detection of a change in availability of at least one of its hardware resources, the change in availability of the at least one hardware resources is related to the detection the connection of the communication device to the communication network and/or to a cable disconnection or connection, using by
  obtaining a list of possible local services corresponding to actions that said communication device is able to implement by relying on its hardware resources, the local being services comprising of one of the following service services: audio and/or video content processing, making audio and/or video contents available for presentation, recording audio and/or video contents, configuration of said communication device, updating of firmware of said communication device, access to online games, access to websites;
  obtaining a list of hardware resources of said communication device that are necessary for offering said local services, the hardware resources being one or more tuners and/or one or more data storage spaces and/or one or more communication interfaces and/or an integrated webcam and/or one or more components dedicated to a particular processing and said communication device takes into account a planning of reservations of local services of said communication device, so that, when the planning shows that hardware resources must be occupied for a period of time that begins at a time below a predefined threshold, said communication device considers that said hardware resources are not available and the communication device refines the list of possible local services according to the availability of the hardware resources;
  obtaining a list of local services available among the possible local services, according to the hardware resources necessary for offering said local services and according to the actual availability of its hardware resources; the hardware resources being one or more tuners and/or one or more data storage spaces and/or one or more communication interfaces and/or an integrated webcam and/or one or more components dedicated to a particular processing; and
  announcing, via the communication network, the list of available local services obtained, in order to enable the at least one managing device to present services globally available in the communication system by means of lists of available local services announced by the communication devices of said communication system.

* * * * *